(12) United States Patent
Do

(10) Patent No.: US 6,849,839 B2
(45) Date of Patent: Feb. 1, 2005

(54) MICROWAVE OVEN HAVING CONTROL APPARATUS FOR PRECISELY CONTROLLING AMOUNT OF SUPPLIED POWER

(75) Inventor: Joo-Hyun Do, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 210 days.

(21) Appl. No.: 10/246,691

(22) Filed: Sep. 19, 2002

(65) Prior Publication Data

US 2003/0192886 A1 Oct. 16, 2003

(30) Foreign Application Priority Data

Apr. 16, 2002 (KR) .......................... 2002-20569

(51) Int. Cl.[7] .............................. H05B 6/68; H05B 1/02
(52) U.S. Cl. ...................................... 219/715; 219/757
(58) Field of Search .......................... 219/715, 702, 219/720, 757, 490; 126/299 R, 299 D (56) References Cited

U.S. PATENT DOCUMENTS 4,613,739 A * 9/1986 Richards ................. 219/506
4,725,948 A * 2/1988 Mierzwinski ............ 219/702
6,211,504 B1 * 4/2001 Lee ......................... 219/757
6,307,343 B1 * 10/2001 Lee et al. ................ 219/702
6,329,646 B1 * 12/2001 Fukuda et al. .......... 219/757

OTHER PUBLICATIONS

English language translation of Abstract of Japanese Patent No. 10211144 published Aug. 11, 1998.

* cited by examiner

Primary Examiner—Teresa J. Walberg
(74) Attorney, Agent, or Firm—Staas & Halsey, LLP

(57) ABSTRACT

A microwave oven with an electric device is provided in which the microwave oven includes an electric device control button and a control unit. The electric device control button drives the electric device by manipulation of a user and generates a power amount control signal to control power supplied to the electric device. The control unit controls the amount of power supplied to the electric device in response to the power amount control signal. The power amount control signal is a single pulse signal that is generated whenever the electric device control button is manipulated; and the amount of power supplied to the electric device is determined depending upon a number of occurrences of the single pulse signal.

18 Claims, 8 Drawing Sheets

MICROWAVE OVEN HAVING CONTROL APPARATUS FOR PRECISELY CONTROLLING AMOUNT OF SUPPLIED POWER

CROSS-REFERENCE TO RELATED APPLICATIONS

This application claims the benefit of Korean Application No. 2002-20569, filed Apr. 16, 2002, in the Korean Intellectual Property Office, the disclosure of which is incorporated herein by reference.

BACKGROUND OF THE INVENTION

1. Field of the Invention

The present invention relates generally to a microwave oven, and more particularly, to a hood and microwave oven combination that has a control apparatus to precisely control an amount of power supplied to the microwave oven.

2. Description of the Related Art

A hood and microwave oven combination is a microwave oven with a ventilation unit. The hood and microwave oven combination is mounted over a gas oven or electric oven. The hood and microwave oven combination serves to both fundamentally perform a microwave oven function and exhaust smoke and odor, which are formed when the gas or electric oven is operated, to the outside by the ventilation unit.

The hood and microwave oven combination is generally equipped with an illumination unit and the ventilation unit to provide convenience when the gas oven or the electric oven is used. The illumination unit lights up a space over the gas oven or the electric oven, while the ventilation unit sucks the smoke and the odor and exhausts the smoke and the odor to the outside. While food is cooked using the gas oven or the electric oven, the illumination unit and the ventilation unit are generally used at the same time.

As occasion demands, the illumination unit and the ventilation unit of the hood and microwave oven combination can be adjusted in illumination intensity and suction and exhaust capacity, respectively. When an interior of a room is dark, the illumination unit is turned up; and when food is being cooked, which produces substantial smoke and odor, the ventilation unit is maximally operated to smoothly exhaust the smoke and the odor. The adjustment of the illumination intensity of the illumination unit and the ventilation capacity of the ventilation unit is carried out though a phase control process, as shown in FIGS. 1A and 1B, which will be described below.

Figure 1A:
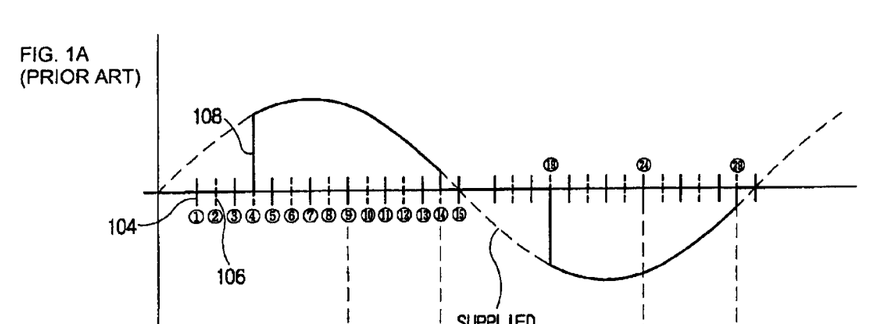
FIGS. 1A–1B are graphs showing amounts of power according to driving points in a conventional hood and microwave oven.
Figure 1B:
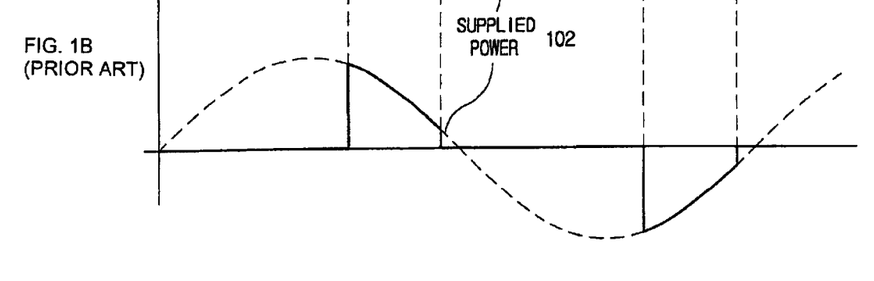

FIGS. 1A and 1B are graphs showing amounts of power according to driving points in a hood and microwave oven. As shown in FIG. 1A, half of a period is divided into eight equal intervals, and display interrupts 104 are generated at points indicated by solid lines to drive a display of the microwave oven. Since interrupts controlling the illumination unit and the ventilation unit of the microwave oven have to be generated at intervals that are shorter than intervals for the display interrupts 104, the half of a period is divided into sixteen equal intervals, and the illumination unit and the ventilation unit controlling interrupts 106 are generated at points indicated by dotted lines to drive the display of the microwave oven.

The illumination intensity of an illumination unit and the driving capability of a ventilation motor are determined depending upon which interrupt point is selected from sixteen equally spaced interrupt points. For the ventilation unit, if an interrupt point ④ is selected as a driving point in FIG. 1A, a ventilation motor driving interrupt is generated at the interrupt point ④ and power of a size corresponding to an area of a shaded portion is supplied to the ventilation motor. FIG. 1B shows a case where a ventilation motor driving point is ⑨ and the power of a size corresponding to the area of a shaded portion is supplied to the ventilation motor. In the above-described cases, the stopping points are all points ⑭. Certain amounts of power are supplied at every half a period, so constant power can be continuously supplied to the ventilation motor while the ventilation motor is driven.

Figures 2A, 2B:
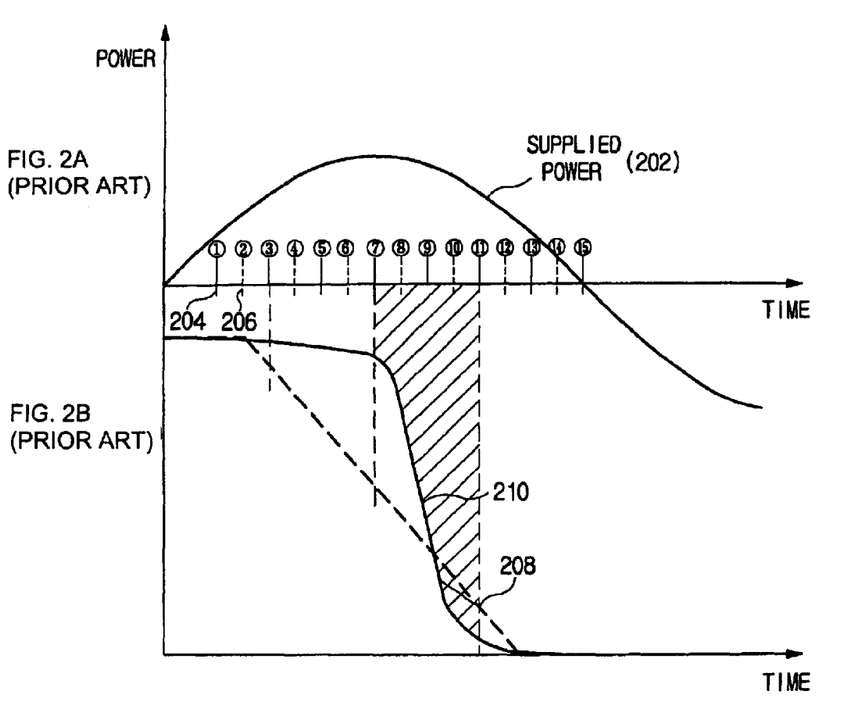
FIGS. 2A and 2B are graphs showing relationships between an external power source of a conventional microwave oven, an interval of interrupts, a ventilation motor output curve and a lamp output curve.

FIG. 2 is a graph showing relationships between a conventional external power source of a conventional microwave oven, an interval of interrupts, a ventilation motor output curve and a lamp output curve. Referring to FIG. 2, a variation of the lamp output curve 208 with respect to a driving point is linear, while a variation of a ventilation motor output curve 210 is non-linear. When the lamp and ventilation motor of the microwave oven are driven at a display interrupt point ① (a driving point becomes ①), a maximum output can be obtained. As the driving point approaches a display interrupt ⑬ through a display point ③, the output of the lamp and ventilation motor of the microwave oven gradually increases and reaches zero at a display interrupt point ⑮. As a result, in order to drive the lamp and ventilation motor of the microwave oven so as to generate a maximum output of the lamp and ventilation motor of the microwave oven, the driving point of the lamp and ventilation motor of the microwave oven has to be set near the display interrupt point ①; to decrease the output of the lamp and ventilation motor of the microwave oven, the driving point has to be set near the display interrupt point ⑮.

The ventilation motor output curve 210, which varies non-linearly, has a particularly large variation over intervals between display interrupt points ⑦ to ⑪, so the ventilation motor needs to be controlled more precisely in the intervals between interrupt points ⑦ to ⑪ than other intervals. To control the ventilation motor more precisely, new interrupts can be generated at narrower intervals than the sixteen equal intervals of half of a period. However, an additional timer may need to be added so as to generate new interrupts at narrower intervals, so a restriction occurs that a high-level microprocessor including a sufficient number of timers may need to be employed. This restriction can cause of an increase in manufacturing cost. Further, the interference of a new interrupt with an existing interrupt can delay an operation caused by the existing interrupt and the delay can deteriorate a reliability of products.

SUMMARY OF THE INVENTION

Accordingly, a microwave oven having a control apparatus for controlling an amount of supplied power is provided, which is capable of generating ventilation motor and lamp driving interrupts together with a display driving interrupt using an existing timer provided to generate the display driving interrupt, and which is capable of precisely controlling the amount of power supplied to a ventilation motor by a manipulation of a ventilation motor control button.

Additional objects and advantages of the invention will be set forth in part in the description which follows and, in part, will be obvious from the description, or may be learned by practice of the invention.

In order to accomplish the above object, a microwave oven with an electric device is provided, comprising: an electric device control button driving the electric device by manipulation of a user and generating a power amount control signal to control power supplied to the electric device; and a control unit controlling the amount of power supplied to the electric device in response to the power amount control signal.

The power amount control signal may be a single pulse signal that is generated whenever the electric device control button is manipulated; and the amount of power supplied to the electric device may be determined depending upon a number of occurrences of a single pulse signal.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 3A:
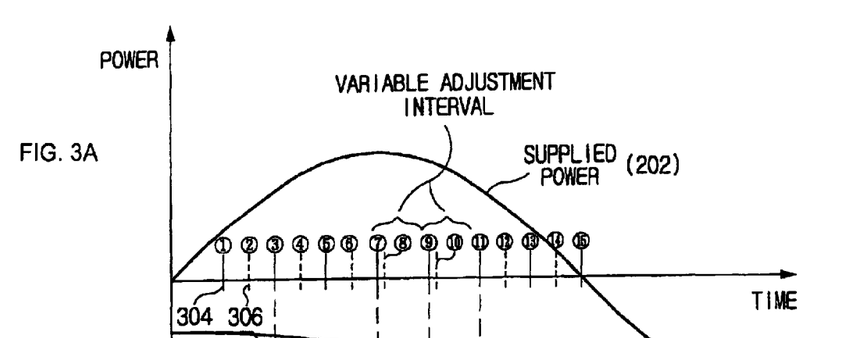
FIGS. 3A and 3B are graphs showing relationships between an external power source of a microwave oven according to an embodiment of the present invention, an interval of interrupts, a ventilation motor output curve and a lamp output curve.
Figure 3B:
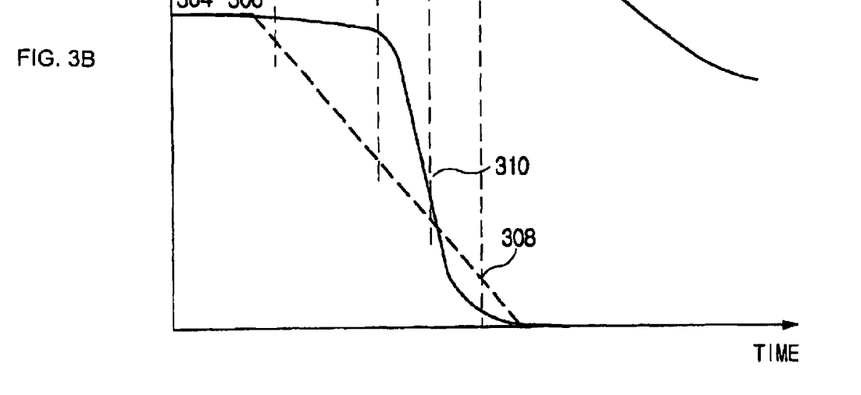

A microwave oven having a control unit precisely controlling the amount of supplied power is described with reference to FIGS. 3 to 8. FIG. 3 is a graph showing relationships between an external power source of a microwave oven of the present invention, an interval of interrupts, a ventilation motor output curve and a lamp output curve. Referring to FIG. 3, the capacity of a ventilation motor is variably controlled by precisely adjusting interrupt points ⑧ and ⑩ within an interval between interrupt points ⑦ and ⑨ and another interval between interrupt points ⑨ and ⑪, respectively.

Figure 4:
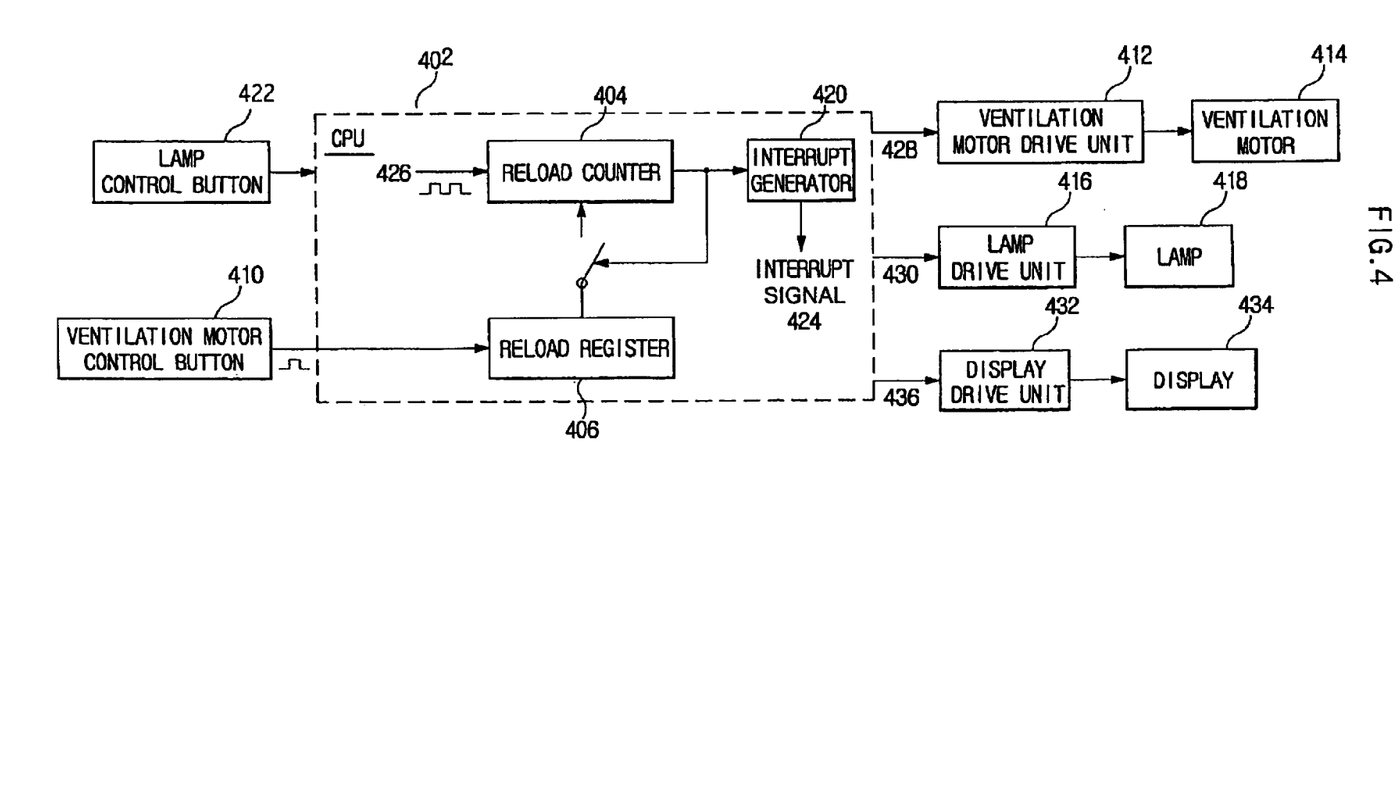
FIG. 4 is a block diagram of a microwave oven control apparatus according to the embodiment of the present invention

FIG. 4 is a block diagram of the microwave oven control apparatus according to an embodiment of the present invention. As depicted in FIG. 4, a control unit 402 includes a reload counter 404 and a reload register 406. The reload counter 404 is synchronized with a clock signal 426 to carry out a count operation. If the reload counter 404 counts to an allowed maximum value and an overflow occurs, the reload counter 404 loads the value of the reload register 406 and counts from the loaded value to the maximum value. That is, the reload counter 404 is initialized to the value of the reload register 406 just after the occurrence of the overflow and performs a count operation. The greater the value of the reload register 406 becomes, the narrower a count range of the reload counter 404, thus reducing a range of the overflow. On the contrary, the smaller the value of the reload register 406 becomes, the wider the count range of the reload counter 404, thus increasing the range of the overflow.

The value of the reload register 406 can be determined by manipulation of a ventilation motor control button 410 of a ventilation motor 414 of the microwave oven. The ventilation motor control button 410 is used to manipulate the ventilation motor 414. When the ventilation motor control button 410 is manipulated while the ventilation motor is operated, the value of the reload register 406 can be changed. The ventilation motor control button 410 generates a single pulse signal whenever the ventilation motor control button 410 is manipulated by a user. The single pulse signal increases the value of the reload register by one. That is, the single pulse signal, which is generated whenever the ventilation motor control button 410 is manipulated, acts like a clock signal and increases the value of the reload register 406 in stages. The value of the reload register 406 is increased to the maximum value of the allowed capacity of the reload register 406, and initialized when overflow occurs. Accordingly, if the ventilation motor control button 410 is repeatedly manipulated while the ventilation motor 414 is operated, the value of the reload register 406 is increased to the maximum value, initiated to zero after reaching the maximum value, and increased again after being initiated to zero. The value of the reload register 406 is visually displayed on a display 434. A user can observe a magnitude of an output of the ventilation motor 414 by viewing the value of the reload register 406 that varies with the manipulation of the ventilation motor control button 410.

An interrupt generator 420 generates an interrupt signal 424 whenever overflow occurs in the reload counter 404. The interval of occurrence of overflows can vary with the manipulation of the ventilation motor control button 410. The control unit 402 processes the interrupt signal 424 to generate one of a ventilation motor drive signal 428, a lamp drive signal 430 and a display drive signal 436 that are used to control a ventilation motor drive unit 412, a lamp drive unit 416 and a display drive unit 432, respectively. A lamp 418 and the display 434 have linear characteristics, and so are not affected by the fine adjustment of a phase according to the present invention.

Figure 5A:
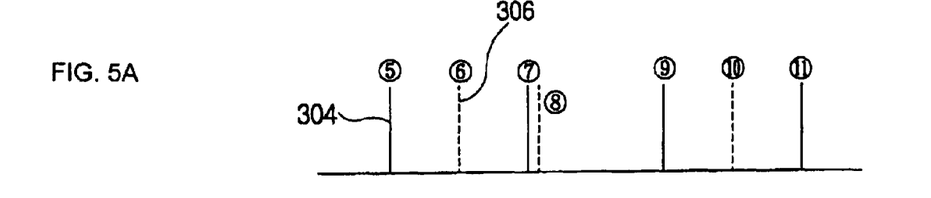
FIGS. 5A–5F are views showing a concept of phase control according to the embodiment of the present invention.
Figure 5B:
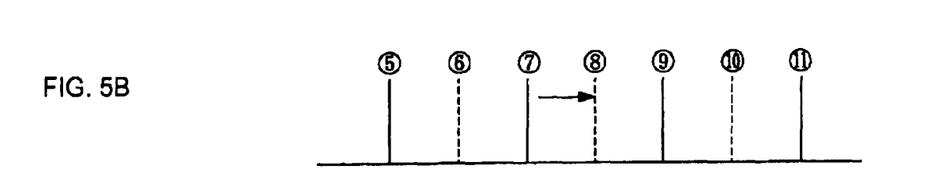
Figure 5C:
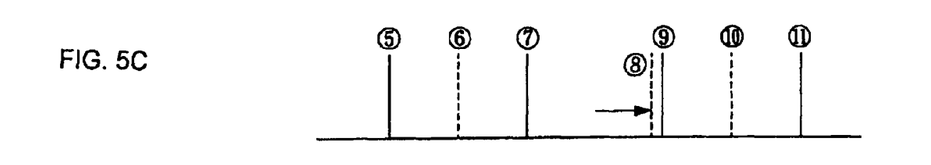
Figure 5D:
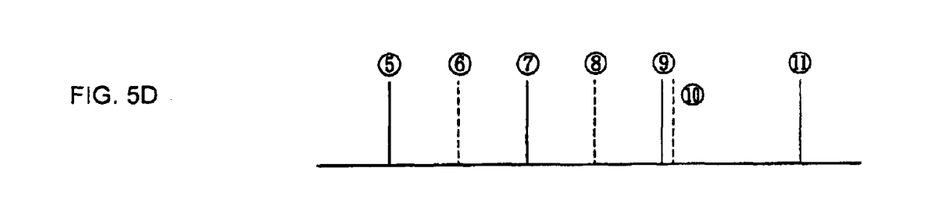
Figure 5E:
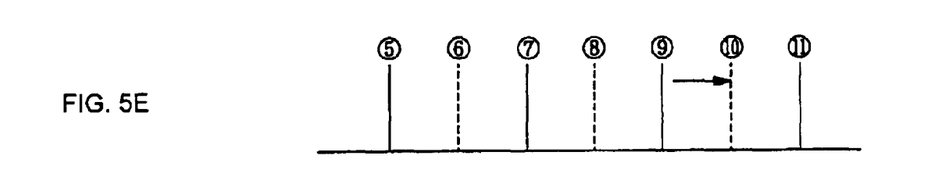
Figure 5F:
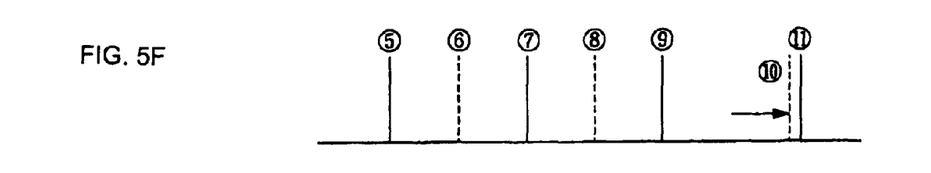

FIGS. 5A–5F are views showing the concept of phase control according to the present invention. FIGS. 5A to 5C to show the phase control of a display interrupt 304 in an interval between interrupt points ⑦ to ⑨. FIGS. 5D to 5F show phase control in an interval between interrupt points ⑨ and ⑪. An interrupt point can be further precisely controlled by precisely varying a fine adjustment interrupt ⑧ within an interval between display interrupt points ⑦ and ⑨. FIGS. 5A to 5C show cases where the values of the reload register 406 are a minimum value, a middle value and a maximum value, respectively. In FIGS. 5D to 5F, an interrupt point can be further precisely controlled by precisely varying a fine adjustment interrupt ⑩ within an interval between display interrupt points ⑨ and ⑪. FIGS. 5D to 5F show cases where the values of the reload register 406 are a minimum value, a middle value and a maximum value, respectively. The maximum and minimum values of fine adjustment interrupts ⑧ and ⑨ correspond to the maximum and minimum values of the capacity of the reload register 406 of FIG. 4, respectively.

Figure 6:
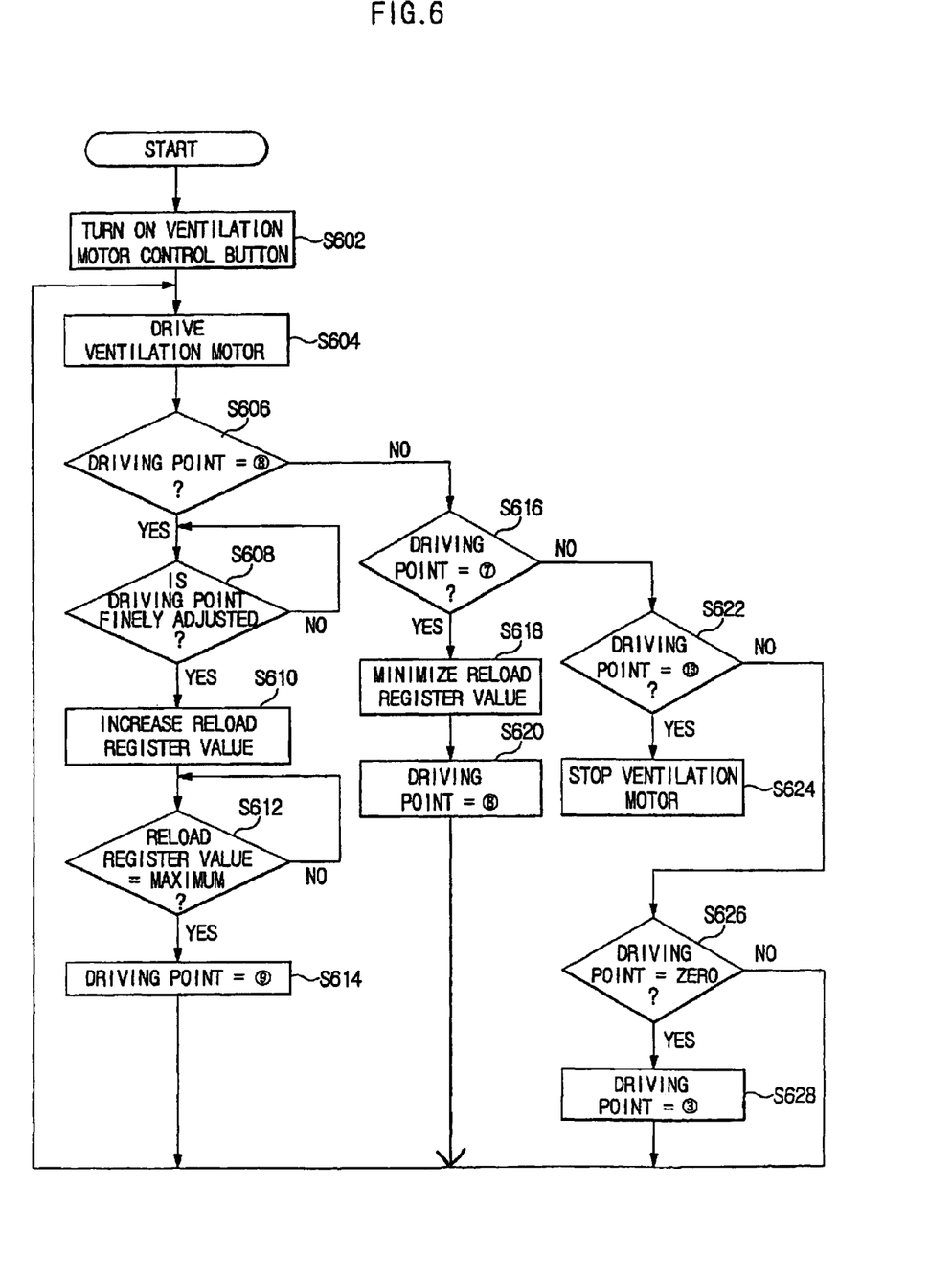
FIG. 6 is a flowchart showing a method of controlling an output of the ventilation motor of the microwave oven in accordance with the embodiment of the present invention.

FIG. 6 is a flowchart showing a method of controlling the output of the ventilation motor 414 of a microwave oven in accordance with the embodiment of the present invention. As shown in FIG. 6, when the ventilation motor control button 410 is turned on at S602, the ventilation motor 414 is driven at S604. In such a case, if the driving point of the ventilation motor 414 is ⑧ at S606 and a user finely adjusts the driving point by manipulating the ventilation motor control button 410 at S608, the value of the reload register 406 is slightly increased. If the value of the reload register 406 reaches the maximum value by the repeated manipulation of the user of the ventilation motor control button 410 at S612, the driving point of the ventilation motor 414 is moved to ⑨ at S614, and the driving of the ventilation motor 414 is started whenever a display interrupt ⑨ occurs at S604.

If the driving point is ⑦ at S616, the value of the reload register 406 is minimized at S618, the driving point is forcibly moved to ⑧ at S620, and the driving of the ventilation motor 414 is started at S604. The fine adjustment of the driving point of the ventilation motor 414 described above can be carried out by forcibly moving the driving point to ⑧ under the condition that the value of the reload register 406 is minimized.

If the driving point is ⑬ at S622, the driving of the ventilation motor 414 is stopped at S624. If the driving point is zero at S626, this means that no value is set in the reload register 406. In this case, the driving point is forcibly moved to ③ at S628 to drive the ventilation motor 414 at S604. Such an operation is carried out within half of a period of supplied power, and a same operation is carried out in a remaining half of the period with its phase reversed. The precise control of an interrupt point ⑩ can be performed within an interval between display interrupt points ⑨ and ⑪ for half a period.

Figure 7:
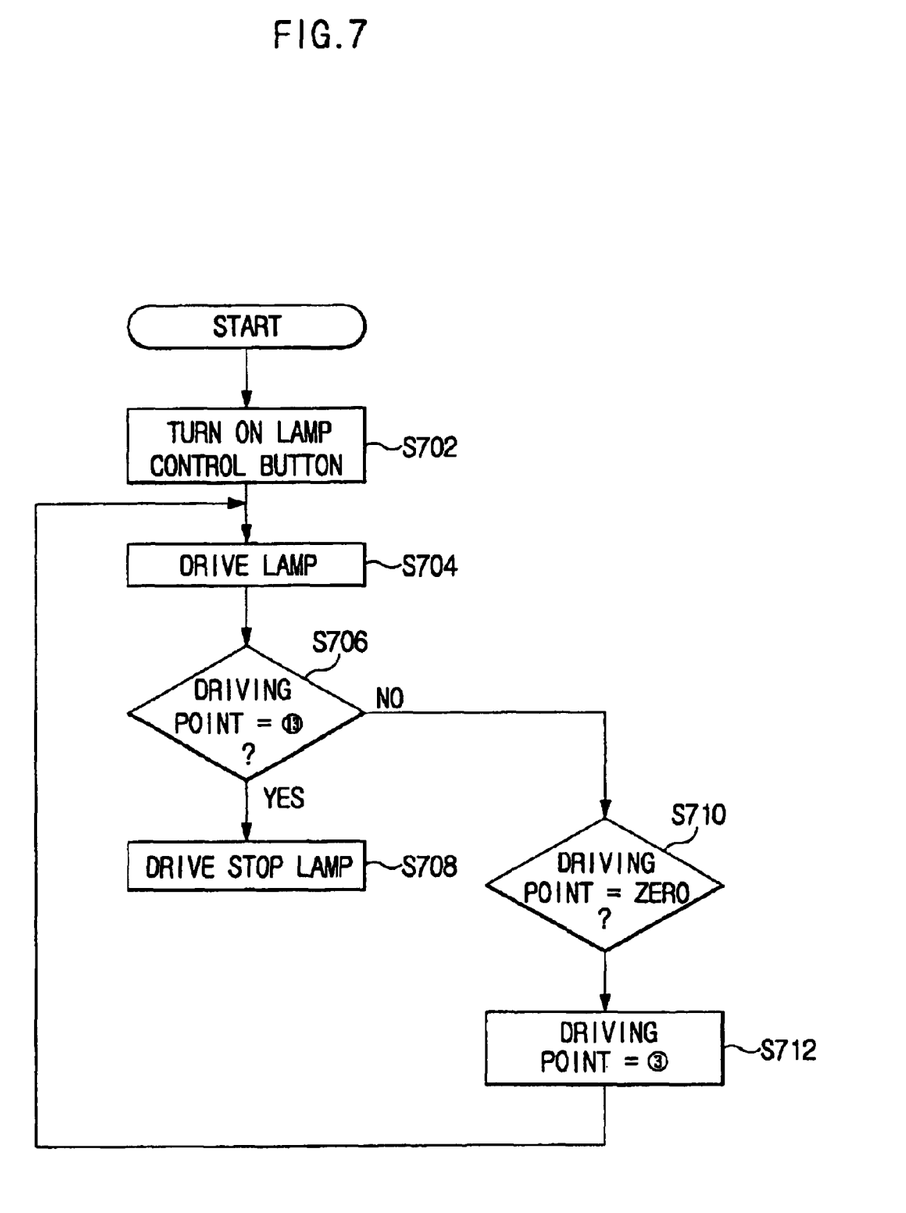
FIG. 7 is a flowchart showing a method of controlling the driving of the lamp of the microwave oven.

FIG. 7 is a flowchart showing a method of controlling the driving of the lamp of the microwave oven. As shown in FIG. 7, when a lamp control button 422 is turned on at S702, the lamp 418 is driven at S704. If the driving point is ⑬ while the lamp 418 is being driven at S704, the driving of the lamp 418 is stopped at S708. If the driving point Is zero at S710, that means that no value is set in the reload register 406. In this case, the driving point is forcibly moved to ③ at S712, and the ventilation motor 414 is driven at 5704.

Figure 8:
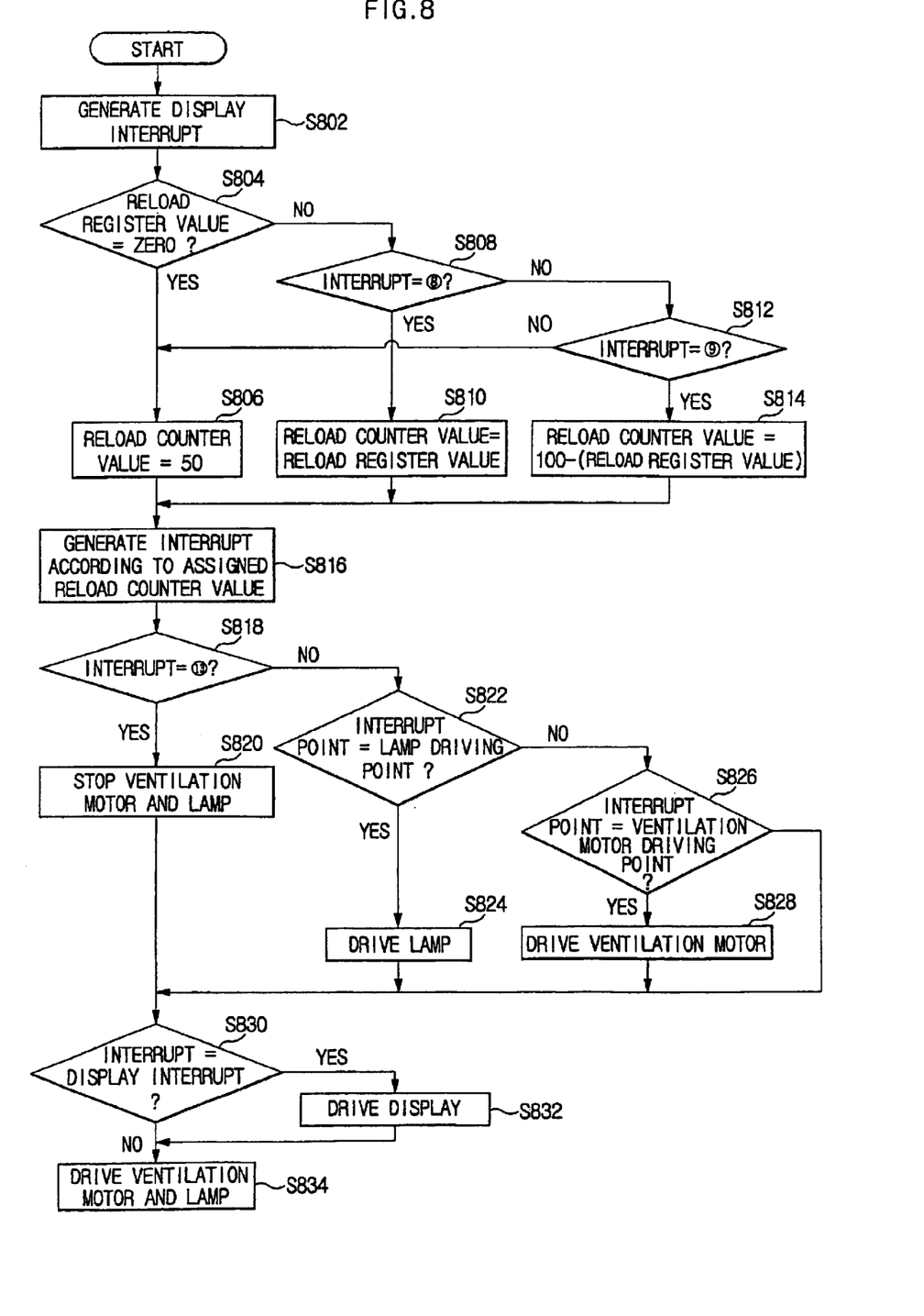
FIG. 8 is a flowchart showing a method of determining a ventilation motor driving point and a lamp driving point.

FIG. 8 is a flowchart showing a method of determining a ventilation motor driving point and a lamp driving point. As shown in FIG. 8, if the value of the reload register 406 is not set at S804 while display interrupts 304, as shown in FIG. 3A, are generated (see S802), "50" is assigned to the reload counter 404 at S806 to generate fine adjustment interrupts 306, as shown in FIGS. 5A to 5F. In this case, "50" is the value that is calculated when the normal interval of occurrence of the interrupts is "100." That is, in this case, fine adjustment interrupts 306 are generated at sixteen equally spaced interrupt points between eight equally spaced display interrupt points.

If the interrupt ⑧ is generated at S808 in the state in which the value of the reload register 406 is set to a certain value, the current value of the reload register 406 is assigned to the reload counter 404 at S810 to enable the fine adjustment.

If an interrupt ⑨ is generated at S812, "100" (the value of the reload register 406) is assigned to the reload counter 404 as the reload counter value at S814. In this case, the value of the reload register 406 is the interval between the interrupt points ⑦ and ⑧. If a next interrupt is generated in the state in which the value of the reload register 406 is "30", the interval of interrupts that are generated thereafter is fixed to "30." Accordingly, when the value between the interrupt points ⑦ and ⑨ is set to "100," "70" is added to the interrupt point ⑧ so as to allow the value between the interrupt points ⑦ and ⑨ to "100. " interrupts are generated according to the value assigned to the reloaded counter 404 at S816.

If an interrupt ⑬ is generated at S818 in the process of the generation of interrupts at S818, the operations of the ventilation motor 414 and the lamp 418 are stopped at S820. If a current interrupt point is a lamp driving point in the state in which the interrupt ⑬ is not generated at S822, the lamp 418 is driven at S824. If a current interrupt point is a ventilation motor driving point in the state in which the interrupt ⑬ is not generated at S826, the ventilation motor 414 is driven at S828.

In the state in which a display interrupt 304 driving the display 434 and a fine adjustment interrupt 306 driving the ventilation motor 414 and the lamp 418 are generated, if a display interrupt 304 is generated at S830, the display 434 is driven at S832. If a fine adjustment interrupt 306 is generated, the ventilation motor 414 and the lamp 418 are driven at S834. As described above, the apparatus for controlling the microwave oven can generate interrupts using the single reload counter 404 to drive the display 434, the ventilation motor 414 and the lamp 418.

The microwave oven having a control apparatus is provided, which is capable of generating the ventilation motor driving interrupt and the lamp driving interrupt together with the display driving interrupt using the existing timer provided to generate the display driving interrupt, thus maximizing the efficiency of use of the timer of the microwave oven, and which is capable of precisely controlling the magnitude of power supplied to the ventilation motor, thus freely controlling the output of the ventilation motor. Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A microwave oven with an electric device, comprising:
   an electric device control button driving the electric device by manipulation of a user and generating a power amount control signal to control power supplied to the electric device;
   a control unit controlling an amount of power supplied to the electric device in response to the power amount control signal, the control unit including a counter increased in response to the power amount control signal and generating an overflow after counting to a maximum value; and
   an interrupt generator generating a power supply interrupt in response to the overflow being generated, and controls power to be supplied to the electric device in response to the power supply interrupt being generated.

2. The microwave oven according to claim 1, wherein the microwave oven is a hood and microwave oven combination.

3. The microwave oven according to claim 2, wherein the electric device is a ventilation motor of the hood and microwave combination.

4. The microwave oven according to claim 1, wherein:
   the power amount control signal is a single pulse signal that is generated in response to the electric device control button being manipulated; and the amount of power supplied to the electric device is determined depending upon a number of occurrences of the single pulse signal.

5. The microwave oven according to claim 1, wherein:
the power amount control signal is a continuous pulse signal, which is generated in response to the electric device control button being manipulated; and
the amount of power supplied to the electric device is determined depending upon a number of pulses of the continuous pulse signal.

6. The microwave oven according to claim 1, wherein the control unit includes a counter having an initial value increased in response to the power amount control signal and generating an overflow after counting from the initial value to a maximum value, and controls power to be supplied to the electric device when the overflow is generated.

7. The microwave oven according to claim 6, wherein the control unit further comprises a register storing the initial value.

8. The microwave oven according to claim 1, wherein a period of occurrence of the power supply interrupt is half of a period of occurrence of a display interrupt to control a display of the microwave oven.

9. The microwave oven according to claim 1, wherein:
the amount of power supplied to the electric device varies with a time of occurrence of each power supply interrupt;
the amount of supplied power has a nonlinear curve with respect to the time of occurrence of the power supply interrupt; and
an interval of occurrence of the power supply interrupts is less than half of an interval of occurrence of the display interrupts over a range where the curve has a preset variation.

10. The microwave oven according to claim 1, further comprising a ventilation unit, wherein power is supplied to the ventilation unit in response to the power supply interrupt.

11. The microwave oven according to claim 10, wherein the power supplied to the ventilation unit in response to the power supply interrupt has a linear curve.

12. The microwave oven according to claim 1, wherein the power amount control signal is changeable based on manipulation by the user of the electric device control button.

13. The microwave oven according to claim 12, wherein the amount of power supplied to the electric device is determined in accordance with a number of manipulations of the electric device control button.

14. The microwave oven according to claim 13, further comprising:

a display displaying a magnitude of an output of the electric device by showing a value of the number of manipulations of the electric device control button.

15. A microwave oven having an electric device control button to generate a power amount control signal for driving an electric device to control power supplied to the electric device, the microwave oven comprising:
a control unit controlling an amount of power supplied to the electric device in response to the power amount control signal, the control unit including a counter having an initial value increased in response to the power amount control signal and generating an overflow after counting from the initial value to a maximum value; and
an interrupt generator generating a power supply interrupt in response to the overflow being generated, and controlling power to be supplied to the electric device in response to the power supply interrupt being generated.

16. A microwave oven having an electric device control button to generate a power amount control signal for driving an electric device to control power supplied to the electric device, comprising:
a control unit controlling an amount of power supplied to the electric device in response to the power amount control signal;
a counter to count based on a user input; and
an interrupt generator generating a power supply interrupt based on the value in the counter, wherein an interrupt point is controllable within an interval between display interrupt points to generate the power supply interrupt.

17. A microwave oven having an electric device control button to generate a power amount control signal for driving an electric device to control power supplied to the electric device, comprising:
an electric device control button producing a power control signal when operated;
a register incrementing from an initial value to a maximum value based on each operation of the electric device control button and resetting to the initial value after reaching the maximum value;
an overflow counter incrementing upon reset of the register; and
an interrupt generator generating a power supply interrupt based on the value in the counter, wherein an interrupt point is controllable within an interval between display interrupt points to generate the power supply interrupt.

18. The microwave oven according to claim 17, further comprising:
a display displaying a value of the register to show a magnitude of an output of the electric device.

* * * * *